Oct. 23, 1962  R. H. OSVOLD  3,060,379
OHMMETER
Filed Sept. 30, 1959

INVENTOR
Robert H. Osvold,

BY  Kenan & Palmer

ATTORNEY

3,060,379
OHMMETER
Robert Harold Osvold, 24 E. Preston St., Baltimore, Md.
Filed Sept. 30, 1959, Ser. No. 843,479
3 Claims. (Cl. 324—62)

This invention relates to electrical resistance measuring apparatus of the type commonly known as ohmmeters. More particularly, the present invention is concerned with a linear scale ohmmeter utilizing an unbalanced Wheatstone bridge and an amplified output of the voltage across the output terminals of the bridge.

Most ohmmeters which are on the market today have logarithmic scales which can be a disadvantage due to the fact that the meter can be read more accurately at the lower scale readings than it can for higher scale readings. Accordingly, it is the principal object of the present invention to provide a portable low cost ohmmeter having a linear scale indicator.

It is a further object of the present invention to provide an ohmmeter which utilizes a Wheatstone bridge as the resistance sensing portion of the circuit.

A still further object of the present invention is to provide an ohmmeter which is extremely versatile in that it can be modified by self-contained switching to certain special useages which demand the reading of resistance either directly, change in resistance, or percentage change in resistance.

Figure 1:
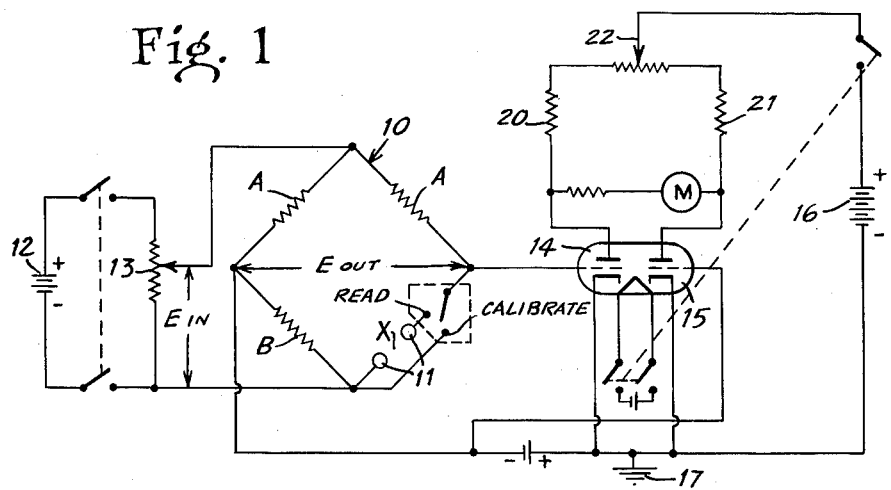
Figure 2:
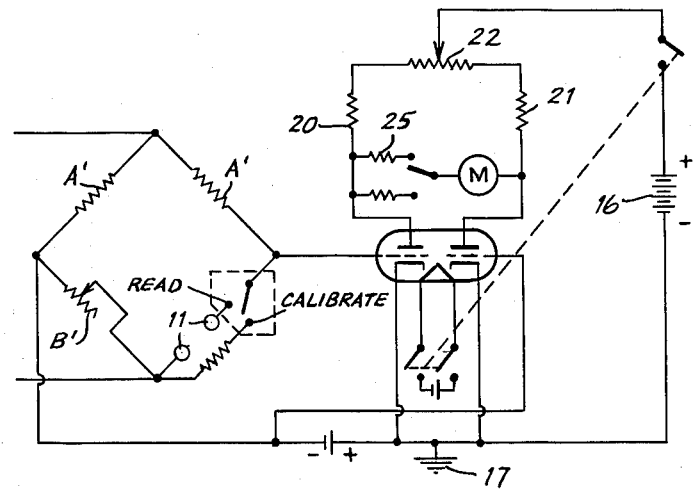
Figure 3:
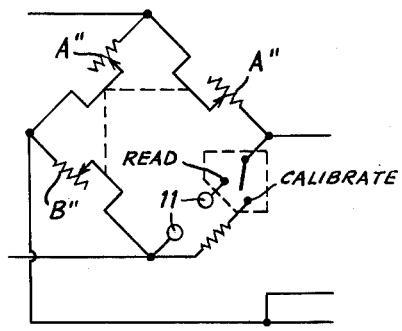

Other objects of the present invention will be apparent to those skilled in the art from the following description taken in conjunction with the attached sheet of drawings in which FIG. 1 is a schematic wiring diagram showing the basic circuit configuration for a linear scale Wheatstone bridge ohmmeter;

FIG. 2 shows a slight modification of the circuit of FIG. 1 which enables the instrument to read a difference in the unknown resistance; and FIG. 3 is a further modification of the basic bridge circuit which enables the indicator to read in terms of a percentage change in the unknown resistance.

Referring now to FIG. 1, the basic bridge indicated by the reference numeral 10 is made up of an upper pair of identical known resistors A and by a third known resistor B. The unknown resistance X will be connected between the terminals 11 to complete the bridge circuit. Power for the bridge is conveniently supplied by means of a battery 12 connected across a potentiometer 13 in order that the input voltage to the bridge may be adjustable.

In order to provide a more accurate measuring arrangement than would be possible by connecting a meter directly across the output terminals of the bridge, a two triode amplifier is employed, operating as a class A amplifier. The two triodes 14 and 15 have a common plate supply indicated by the battery 16. The cathodes are both grounded as indicated at 17. The output terminals of the bridge are connected directly between the grid and the cathode of triode 14. Assuming a constant anode supply voltage on the two triodes therefore, it will be apparent that there will be a difference in the plate currents of the two tubes, depending upon the degree of unbalance of the bridge circuit. By connecting a meter between the anodes of the two tubes, this meter will indicate the difference in anode voltage between the two. This difference voltage will of course vary with the degree of unbalance of the bridge. The meter, therefore, can be calibrated on a linear scale to read the exact quantity in ohms of the resistance of the unknown leg of the bridge.

Theory of Operation

With the two upper arms A of the bridge equal in resistance, it will be apparent that the bridge will be balanced when the unknown resistance X is equal to the known resistance B. Whenever X does not equal B, however, the bridge becomes unbalanced and produces an output voltage which, if the unknown resistance is to be measured on a linear scale, must vary in direct proportion to the value of the unknown resistance. The output voltage of the bridge $E_{out}$ may be expressed in terms of the input voltage $E_{in}$, A, B, and X, by the following equation:

$$E_{out} = \frac{E_{in} A(X-B)}{(A+B)(A+X)} \quad (1)$$

If the above equation has its numerator and denominator divided by $B^2$, Equation 1 becames $$E_{out} = \frac{E_{in} \frac{A}{B}\left(\frac{X}{B}-1\right)}{\left(\frac{A}{B}+1\right)\left(\frac{A}{B}+\frac{X}{B}\right)} \quad (2)$$

Equation 2 is easier to work with because in this instance there are ratios rather than absolute values. It will be apparent that if the ratio $$\frac{A}{B}$$

is made of the order of 100 times larger than the ratio $$\frac{X}{B}$$

that the $$\frac{X}{B}$$

term in the denominator can be effectively neglected and Equation 2 then reduces to the following simplified relationship:

$$E_{out} = \frac{E_{in}\left(\frac{X}{B}-1\right)}{\frac{A}{B}+1} \quad (3)$$

Equation 3 it will be seen is a linear equation of the form $E_{out} = AX - B$. If the largest value of X to be measured is equal to 2B, then $$\frac{A}{B} = 200$$

and Equation 3 becomes $$E_{out} = \frac{E_{in}}{200}$$

Equation 4 will have a maximum error of not more than 1% over the exact Equation 2 for the largest value of the unknown resistance X.

Unfortunately, the output voltage $E_{out}$ cannot be measured directly by connecting a meter across the output terminals of the bridge because of the loading effect that a meter would have which would destroy the linearity of Equation 3. To get around this difficulty, therefore, the output voltage is connected directly between the grid and cathode of the amplifier circuit. As thus connected, the bridge output will be effectively connected to an infinite impedance. This is so, because the direct coupling to the input of the amplifier will be a substantially pure capacitance which is an infinite impedance as far as D.C. voltage is concerned. The meter may conveniently be a zero center scale microammeter with a suitable internal multiplier. When the plate voltages of the two triodes are equal, therefore, the meter will stand at its center position corresponding to zero current flow through the meter and this point, of course, will be the midpoint on the resistance scale. Since the triode 15 has a constant grid bias and a constant plate voltage, its anode current will be constant as will its anode voltage. The anode current, and therefore the anode voltage of the triode 14, however, will vary in accordance with the degree of unbalance of the bridge, which is either added to or subtracted from the grid bias to effect the ultimate grid voltage of the triode 14.

The anode load resistors 20 and 21 are made equal and the adjusting potentiometer 22 is for the purpose of compensating for any inequality in either the load resistors or in the two triodes.

As one working embodiment of the above described invention, the following electrical values of the various circuit components have been found to yield satisfactory results:

| | | |
|---|---|---|
| Potentiometer 13 | ohms | 25K |
| Potentiometer 22 | do | 5K |
| Resistors 20 and 21 | do | 6.8K |
| Triodes 14 and 15 | | 1-6SN7 |
| Resistor A | ohms | 10M |
| Resistor B | do | 50K |
| Battery 16 | volts | 135 |
| Battery 12 | do | 45 |
| Grid bias | do | 2.5 |
| Meter | microamps | −50+50 |
| Meter multiplier | ohms | 39K |

The alternative embodiments shown in FIGS. 2 and 3 may be incorporated in the same instrument by the simple expedient of adding sections to gang switches to provide for changing those portions of the circuit necessary to effect the different bridge configurations and meter multiplier scales. Both are primarily for the purpose of measuring a change in resistance, as, for example, in medical psychology work to measure a patient's skin resistance under normal and abnormal conditions.

FIG. 2 shows essentially the same circuit as that shown in FIG. 1, but with the addition of another multiplier for the meter scale and the arm B of the bridge denoted $B^1$ in FIG. 2 is made variable in calibrated steps of 5,000 ohms from 0 to 100,000 ohms.

In order to understand the theory of operation of the bridge circuit shown in this figure, we can begin with our basic bridge Equation No. 1. In this instance, we want $E_{out}$ to vary linearly not with X but with $X-B$ and to read the same for the same difference $X-B$ regardless of the absolute values of either B or X. If the resistance of the arms A is much larger than either X or B, this condition will be fulfilled.

In place of the short circuit calibrate position of the bridge switch shown in FIG. 1, we substitute for this embodiment a 50,000 ohm precision calibrating resistor.

The bridge circuit shown in FIG. 3 is merely another way in which changes in skin resistance can be measured. As in the embodiment shown in FIG. 2, the leg $B''$ is again calibrated in 5,000 ohm steps from 0 to 100,000 but $B''$, $A''$ and $A''$ are ganged together so that they all operate from a common shaft. Thus, the arms A instead of being fixed vary in direct proportion to B.

The theory of operation of this bridge circuit may be explained as follows:

The percentage change in resistance from balance is $$\Delta \text{ percent} = \frac{X-B}{B}(100)$$

The above equation may be rearranged as follows:

$$X = \frac{B\Delta \text{ percent}}{100} + B$$

Substituting the latter in the Equation 1, we have the following equation:

$$E_{out} = \frac{E_{in}AB\dfrac{\Delta \text{ percent}}{100}}{(A+B)\left(A+B+\dfrac{B\Delta \text{ percent}}{100}\right)}$$

Not only must the bridge output voltage vary linearly with the percentage change in resistance, but the bridge output voltage must also be the same for a constant percentage change, regardless of the value of $B''$. If a numerator and denominator of the right hand side of the above equation are divided by $B^2$, the result is as follows:

$$E_{out} = \frac{E_{in}\dfrac{A}{B}\dfrac{\Delta \text{ percent}}{100}}{\left(\dfrac{A}{B}+1\right)\left(\dfrac{A}{B}+1+\dfrac{\Delta \text{ percent}}{100}\right)}$$

The latter equation shows that if the ratio of A to B remains constant, that the equation is independent of the absolute values of either B or A.

Returning now to FIG. 1 of the attached sheet of drawings, the procedure for operating the ohmmeter will be as follows:

(1) Turn on the power switch to apply anode and filament voltage to the triodes 14 and 15.

(2) Next adjust the potentiometer 22 until the meter needle stands at 5 which would correspond to the center of its plus minus scale.

(3) Turn the calibration switch to calibrate position and then apply power to the bridge from the battery 12.

(4) Adjust the potentiometer 13 until the meter needle indicates zero resistance.

(5) Insert the unknown resistor at X in the bridge circuit and switch the calibrate read switch to read position. The meter needle will now read the correct value of the resistance X.

In order to operate the embodiment shown in FIG. 2, steps 1 and 2 will be identical. (The following steps assume a basic normal skin resistance of 25,000 ohms.)

(3) Place the read calibrate switch in the calibrate position which puts a precision 50,000 ohm resistor in the X leg of the bridge and set B' at 25,000 ohms.

(4) Apply power to the bridge from battery 12 and adjust the potentiometer 13 until the meter needle reads +25,000 ohms.

(5) Connect the patient's skin (usually on the arm) into the X leg of the bridge and change the read calibrate switch to the read position.

(6) Readjust the $B^1$ arm of the bridge until the meter needle reads zero. The setting of the resistor $B^1$ is now equal to the normal skin resistance. Now the necessary medical psychological tests are given to the patient, and the resulting changes in skin resistance may be read on the meter directly.

The percentage change bridge which is illustrated in FIG. 3 is merely another way to measure changes in skin resistance.

The use of the constant percentage difference bridge circuit as shown in FIG. 3 is also based on an assumption of a normal skin resistance of 25,000 ohms. The selection of a meter multiplier, is then merely a matter of choice depending on the extent of changes noted in skin resistance in a given patient. For example, one multiplier may yield readings of plus or minus 5% and the other of plus or minus 25%. The only change in the procedure as set forth for FIGS. 1 and 2 is in step #3 where the arm $B^{11}$ is set at 40,000 ohms instead of 25,000 ohms. This is necessary because $$\frac{X-B}{B} = 25\%$$

With X equal to 50,000 ohms, B must be 40,000 ohms.

From the foregoing it will be apparent that there is herein shown and described a new and useful form of ohmmeter with a linear read-out indicator. While preferred embodiments have been herein shown and described, applicant claims the benefit of a full range of equivalents within the scope of the appended claims.

I claim:

1. A linear scale ohmmeter comprising: a Wheatstone bridge having three known arms, two adjacent identical arms A, a third B and one unknown arm X, the ratio of $A/B$ being at least 200 and the linearly measurable range of X lying between 0 and $A/100$; means affording connection of a constant source of D.C. voltage to said bridge between the juncture of said identical arms A and the opposite corner of the bridge; a pair of electron-discharge devices, each having at least three electrodes; means connecting the unbalanced bridge voltage across the grid cathode circuit of one of said devices; indicating means connected between the anodes of said devices to respond to the differences in anode voltage for varying degrees of bridge unbalance proportional to value of the unknown resistance; and means for applying a stable D.C. voltage to the anodes of said discharge devices.

2. A linear scale ohmmeter comprising: a Wheatstone bridge having three known arms, two adjacent identical arms A, a third B and one unknown arm X, the ratio of $A/B$ being at least 200 and the linearly measurable range of X lying between 0 and $A/100$; means affording connection of a constant source of D.C. voltage to said bridge between the juncture of said identical arms A and the opposite corner of the bridge; a pair of grounded cathode triodes; means including anode resistors and a potentiometer connected in series for supplying D.C. anode voltage to said triodes; active circuit means negatively biasing one of said triodes; means connecting the other opposite pair of bridge terminals between said active circuit means and the grid of the other of said triodes; and indicating means connected between the anodes of said triodes to respond to differences in anode voltages caused by varying degrees of unbalance of said bridge, said indicating means being calibrated in units of resistance.

3. An ohmmeter as defined by claim 2 in which said three known arms are variable and means for simultaneously varying the resistance of said three known arms.

References Cited in the file of this patent

UNITED STATES PATENTS

| | | |
|---|---|---|
| 1,460,530 | Brown et al. | July 3, 1923 |
| 2,498,103 | Wojciechowski | Feb. 21, 1950 |
| 2,841,765 | Harrold | July 1, 1958 |

OTHER REFERENCES

Bridge Arms (Marshall) from text: Measurements in Electrical Engineering, pp. 71 and 72 relied on, published by John S. Swift Co., Inc., Cincinnati.